Patented Aug. 17, 1926.

1,596,587

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

TREATMENT OF WATER IN OIL EMULSIONS.

No Drawing.    Application filed December 23, 1924. Serial No. 757,736.

This invention relates to the treatment of emulsions of mineral oil and water, such as petroleum emulsions, for the purpose of separating the oil from the water.

Petroleum emulsions of the kind referred to are commonly known as "cut oil," "roily oil" and "bottom settlings", and consist of oil constituting the continuous phase of the emulsion, droplets of water distributed throughout the body of oil and constituting the dispersed phase and films of matter that encase the droplets of water. The conventional process for breaking such emulsions contemplates subjecting the emulsion to the action of a substance or a compound which acts on the emulsion in such a manner that the water of the emulsion will separate from the oil when the emulsion is allowed to remain in a quiescent state, at a suitable temperature, after treatment. Various kinds of soaps are suitable treating agents for such emulsions, and in some instances are perfectly satisfactory, on account of their ability to disperse readily throughout the entire mass of emulsion. In other instances better results can be attained with a compound composed of a relatively great proportion of a substance that is highly active as a treating agent, such as a fatty acid or a modified fatty acid, and a relatively small proportion of a substance, such as soap, that will promote solubility of the compound in water. It has also been proposed to treat such emulsions with a compound composed of a treating agent and soap mixed in such proportions as to produce a mixture colloidally soluble in the oil of the emulsion, and with the soap actually soluble in the water which constitutes the dispersed phase of the emulsion.

I have discovered that water in oil emulsions can be broken effectively and at a low cost, if the medium used to treat the emulsion be composed of a non-saponaceous substance that is highly active as a treating agent, and a substance which acts as a carrier to convey the treating agent to the films of the emulsion in which the droplets of water are encased. Such a mixture is exceptionally efficient, because the treating agent of same is carried directly to the emulsifying films and deposited thereon in sufficient quantities to insure a satisfactory "break" when the emulsion is allowed to remain in a quiescent state after treatment, and in some instances it can be made cheaper than the mixtures heretofore used for treating water in oil emulsions, because only the optimum amount of treating agent is used and the balance of the mixture which constitutes the carrier for the treating agent can consist of a relatively low priced substance. Any non-saponaceous substance that is a highly active treating agent for a water in oil emulsion can be used to form the treating agent of the mixture, and various substances can be used to form the carrier of the mixture. It is essential, however, that the substance used to form the carrier be of such a nature that when it is immersed in oil it will be capable of attracting and holding the treating agent of the mixture and also be capable of forming a brine-in-oil emulsion so that it will adsorb as a film around droplets of water, thereby causing the treating agent to be carried directly to and deposited on the emulsifying films in which the droplets of water are encased. Zinc oleate is a substance that has the properties or characteristics above specified and other substances are colloidal iron and colloidal zinc. As previously stated, however, it is immaterial what substance is used to constitute the carrier of the mixture so long as it has the properties above mentioned, and accordingly, I wish it to be understood that the mixture contemplated by my invention may be composed of any suitable non-saponaceous treating agent and any suitable substance or substances that will function as a carrier, as above described to hold the treating agent and convey the same to the films of the emulsion with which the compound is mixed.

The particular proportions of the treating agent and the carrier may be varied within certain approximate limits, but the substance that is used as the carrier will generally constitute from 40% to 60% of the mixture. The mixture need not be made with quantitative preciseness, but usually the treating agent and the carrier will be mixed in approximately equal proportions, with a variation of from 5% to 10% either way. In other words, in some instances 40% of carrier and 60% of treating agent may be used, and in other instances, 60% of carrier and 40% of treating agent may be used, these variations resulting from the fact that it is always preferable to use the optimum amount of treating agent and the minimum amount of carrier. Whether or not the substance that is used to constitute the carrier has any treating properties is immaterial, as the function of said substance is to convey the treating agent to the point where it will be most effective, namely, on the films in which the droplets of water are encased. Therefore, in some instances the carrier may be a weak treating agent; in other instances it may be inert and in other instances it may be a hostile treating agent.

The mixture is intended to be used in the same way as the substances and compounds now used to treat water in oil emulsions for the purpose of breaking same, the usual method consisting in adding the treating medium to the emulsion or mixing it with the emulsion and thereafter permitting the emulsion to remain in a quiescent state, at a suitable temperature, after treatment.

In order to emphasize the distinction between my improved mixture and a substance that has heretofore been used successfully for treating water in oil emulsions, I will state that di-hydroxystearic acid is a suitable non-saponaceous agent for treating many of the emulsions from the oil fields adjacent to Smackover, Arkansas, and when used in the ratio of one barrel of treating agent to one thousand barrels of emulsion, will successfully treat the same. The ammonium soap of this fatty acid is not particularly effective, however, as a treating agent, and will rarely break an emulsion from the district mentioned, even when used in the ratio of two barrels of soap to one thousand barrels of emulsion. However, when such substances are combined in accordance with my invention, namely, approximately equal proportions of di-hydroxystearic acid and ammonium soap, a treating mixture is produced that is approximately twice as effective as the fatty acid alone and approximately four times as effective as the soap alone.

The above example is given merely as an illustration of what is accomplished by the use of a balanced ratio of two substances heretofore used in the treatment of water in oil emulsions, and accordingly, should not be construed as limiting the invention, for as previously stated, my broad idea contemplates the use of any suitable non-saponaceous treating agent and any suitable carrier which will cause the treating agent to be adsorbed on the emulsifying films of the emulsion in such quantities as to effectively break the emulsion.

Having thus described my invention, what I claim as new and desire to secure by Letters Patent is:

1. A process for breaking water-in-oil emulsions, characterized by adding to such an emulsion a mixture composed of a suitable non-saponaceous demulsifying agent and a substance that is capable of forming a brine-in-oil emulsion, mixed in approximately equal proportions.

2. A process for breaking water-in-oil emulsions, characterized by adding to such an emulsion a mixture composed of a suitable non-saponaceous demulsifying agent and a detergent substance that is capable of forming a brine-in-oil emulsion, mixed in approximately equal proportions.

MELVIN DE GROOTE.